Aug. 3, 1954 — L. C. WALES — 2,685,652
REACTION TURBINE

Filed March 20, 1951 — 2 Sheets-Sheet 2

Inventor
Lester C. Wales
by Roberts, Cushman & Grover
Att'ys

Patented Aug. 3, 1954

2,685,652

UNITED STATES PATENT OFFICE 2,685,652

REACTION TURBINE

Lester C. Wales, Winthrop, Maine

Application March 20, 1951, Serial No. 216,531

2 Claims. (Cl. 290—52)

This invention relates to fluid operated turbo-generators and more especially to reaction turbines. The principal objects of the invention are to provide a turbine which is particularly suitable for generation of electric power, which has a simplified and improved construction such that a single foundation is all that is necessary for supporting the turbine and generator parts, in which the turbine and generator parts are designed to provide a compact unit adapted to occupy a minimum of space and in which all of the moving parts turn about a common vertical axis.

Other objects of the invention are to provide an improved arrangement of the blades to afford a maximum use of the energy of the motivating fluid and which will be equally applicable in principle to the use of water or steam as the motivating fluid.

As herein illustrated, the turbine has a pedestal-like base on which there is placed a base plate arranged to turn thereon about a vertical axis coincident with the axis of the pedestal and perpendicular to the plate. A skirt is made fast to the peripheral edge of the base plate and extends substantially vertically downward therefrom, its lower end being held concentric with the pedestal by bearings. The plate and skirt constitute a rotor, the outer cylindrical surface of which serves as a support for a plurality of blades. Resting on the first base plate and substantially parallel thereto, is a second base plate mounted to turn freely about the axis of the first base plate and rising therefrom is a second skirt, the outer surface of which is substantially coterminus with the surface of the first skirt. This second plate and skirt constitute a second rotor, the cylindrical surface of which serves as a support for other blades. At the upper end of the second rotor or an extension thereof, is made fast one part of a generator unit and the other part is supported in concentric relation therewith by a cage resting at its lower end on the base plate of the first rotor and rising therefrom outside the first rotor. The rotors as thus mounted are free to turn relatively in opposite directions to move the generator parts in directions to generate current. On the second rotor are three sets of blades, the first two sets being situated to receive the impact of a motivating fluid delivered thereto in substantially tangential fashion from a spiral or large nozzle, and the third set being arranged at an angle to receive the impact of the gravitating fluid after its initial velocity and impact have been consumed in imparting motion to the first and second sets of blades. The blades on the first rotor are also arranged angularly but in opposite directions to the third set of blades on the second rotor and are driven by the impact of the fluid falling from the three sets of blades on the second rotor.

The particular construction and operation of the reaction turbine which forms the subject matter of the present invention will now be described in greater detail with reference to the accompanying drawings wherein:

Fig. 1a is an enlarged fragmentary section showing the bearing support for one rotor;

Fig. 1b is an enlarged fragmentary section showing the bearing support for the other rotor;

Figure 1:
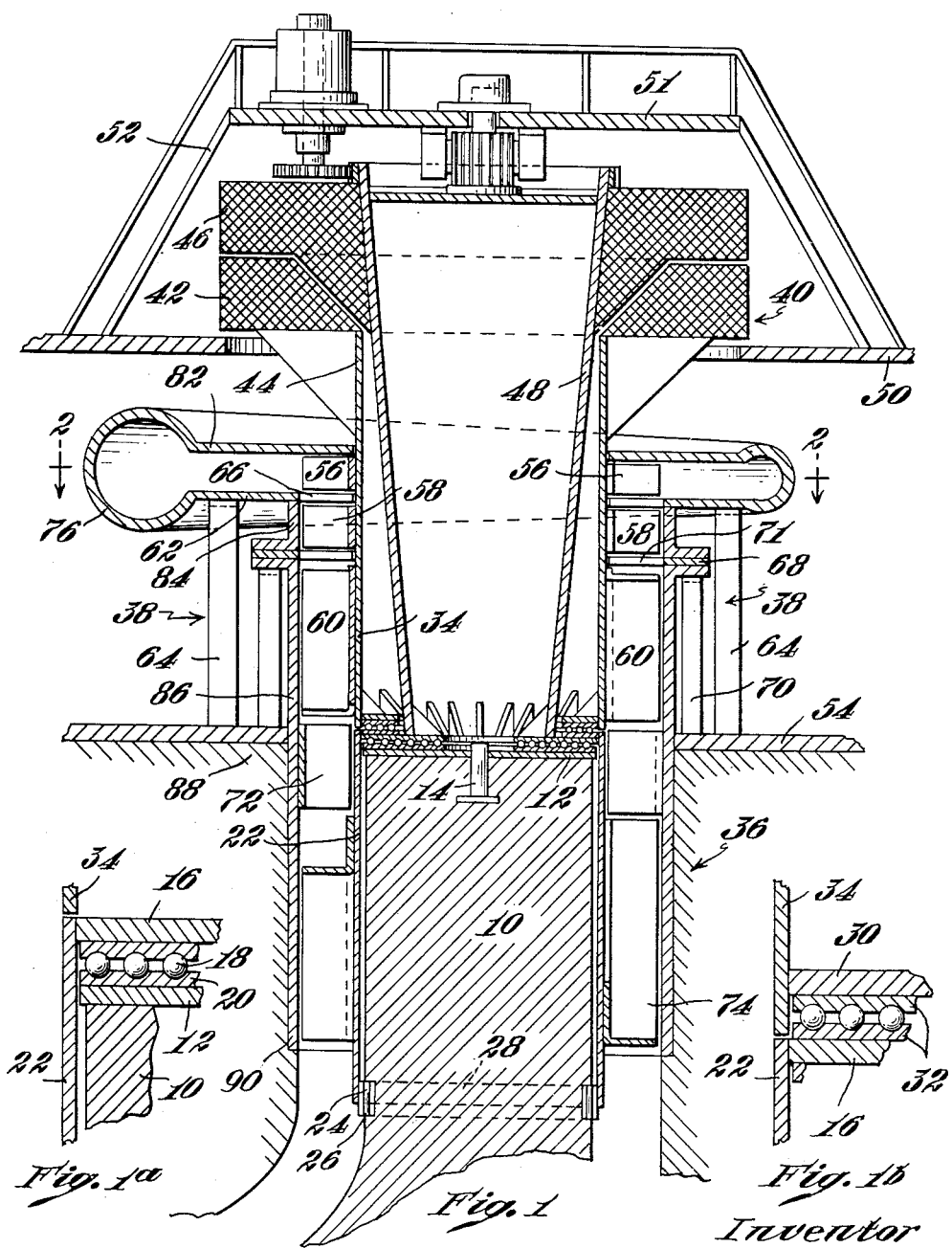
Fig. 1 is a vertical, diametrical section through the turbo-generator.

Referring to the drawings, the turbine parts are supported for rotation on a pedestal-like foundation 10 comprised of poured concrete, cylindrical in shape, and having a flat top. To prevent crumbling and to provide a suitably wear-resistant bearing surface, a bearing plate or cap 12 is placed on top of the pedestal 10, being held concentric therewith by a centering pin 14. An annular base plate 16 is placed on the cap 12 with a plurality of ball bearings 18 situated therebetween, preferably confined in a cage 20 of conventional design, to permit frictionless turning of the base plate on the upper end of the pedestal. A cylindrical skirt 22 is attached by welding or other suitable means to the peripheral edge of the annular base plate 16 and extends substantially vertically downward therefrom parallel to the cylindrical surface of the pedestal to near the bottom. The lower edge of the skirt is held in concentric, spaced relation with the surface of the pedestal by a plurality of peripherally arranged, spaced roller bearing guides 24 arranged to turn about vertical axes and housed in an annular cage 26 set into an annular recess 28 in the foundation pedestal. As thus arranged and supported by the ball bearings and roller bearings, the base plate 16 and attached depending skirt 22 which form one rotor of the apparatus, will turn about a substantially vertical axis coincident with the axis of the pedestal without wobble. A second annular base plate 30 (Fig. 1b) is placed on the base plate 16 with roller bearings 32 interposed therebetween to permit free rotation of the base plate 30 about the vertical axis of the pedestal relative to the base plate 16. The ball bearings are contained in a suitable cage 32. A second skirt 34 is made fast to the peripheral edge of the second annular base plate 30 and rises therefrom substantially vertically, the outer surface of the skirt 34 being coterminus with the outer surface of the skirt 22, forming a second rotor. As thus arranged, the skirts 22 and 34 are free to rotate relative to each other in opposite directions about the vertical axis of the pedestal and as such, form rotors 36 and 38 which support sets of blades to be described hereinafter, for effecting their rotation and also forming the support for the component parts of a generator 40. The field 42 of the generator is made fast to the upper end of the rotor 38 or at least to an extension 44 thereof rising above that portion which carries the blades. The rotor 46 of the generator is supported in concentric relation with the field 42 by a hollow column 48, the lower end of which rests on the base plate 16 of the first rotor, is made fast thereto, and rises upwardly through the second rotor to a point above the extension 44 thereof.

At about the generator level of the turbine, there is a horizontal floor 50 through which the parts 44 and 48 extend so that the field and rotor of the generator are situated just above the floor. On the floor 50 is located a bridge-like platform 51 extending across the top of the generator, which may be reached by ladders 52 and which supports conventional equipment for taking current from the generator. Below the floor 50 and substantially at the level of the top of the pedestal 10 there is situated a second floor 54 which forms a support for various of the operating parts of the turbine as will now be described.

Figure 3:
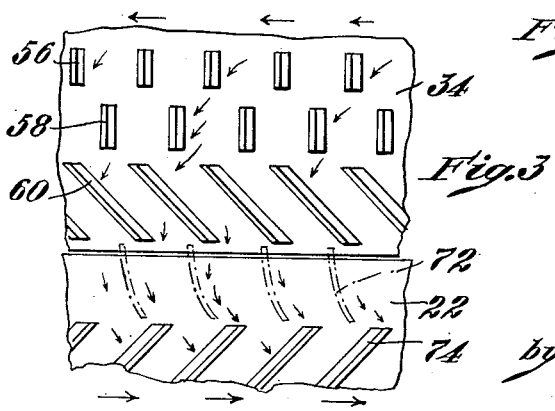
Fig. 3 is a fragmentary view of the surface of the rotors developed in a flat plane, showing the arrangement of the blades.

On the outer peripheral surface of the rotor 38, there are made fast three sets of blades 56, 58 and 60 (Fig. 3). The blades 56 are flat, arranged substantially vertically and extend radially from the surface of the rotor in paddle-wheel fashion, and are of comparatively narrow width from top to bottom. The blades 58 are of similar shape and disposition and are situated below the blades 56 on the surface of the rotor. The blades 60 extend radially from the surface of the rotor but are inclined to its vertical axis at an angle of substantially 45° and are comparatively long from their top to their bottom edge, these blades being spaced below the blades 58. Between the blades 56 and 58 (Fig. 1) there is arranged a horizontal platform 62 which is held in position by stanchions 64 rising from the floor 54 and which has a hole centrally thereof through which rises the rotor 38. Arranged around the platform 62 at spaced, uniformly distant positions are holes 66 corresponding in number to the entrances in the water passage through which fluid acting upon the first or topmost set of blades 56 may flow downwardly through the hole for contact with the second set of blades 58 situated therebeneath. Between the second set of blades 58 and the third set of blades 60, there is another platform 68 corresponding to the platform 62, which is supported from the floor 54 by stanchions 70, has a central hole therein through which the rotor 38 rises and a plurality of peripherally spaced holes 71 in the inside passage through which water from the second set of blades may gravitate for impingement upon the third set of blades 60. At the floor level 54 there is made fast to the floor surrounding the lower part of the rotor 38 and the upper part of the rotor 36 a plurality of stationary blades 72 within which the turbine parts are free to turn, arranged at an angle to receive the water falling from the blades 60 and to change its direction of flow. Below the stationary blades 72 there is made fast to the external surface of the rotor 36 a plurality of blades 74 corresponding in number and disposition to the blades 60 but set at an opposite angle thereto so that the water falling from the blades 60 through the stationary blades 72 and impinging upon the blades 74 will impart an opposite rotation to the rotor 36.

Figure 2:
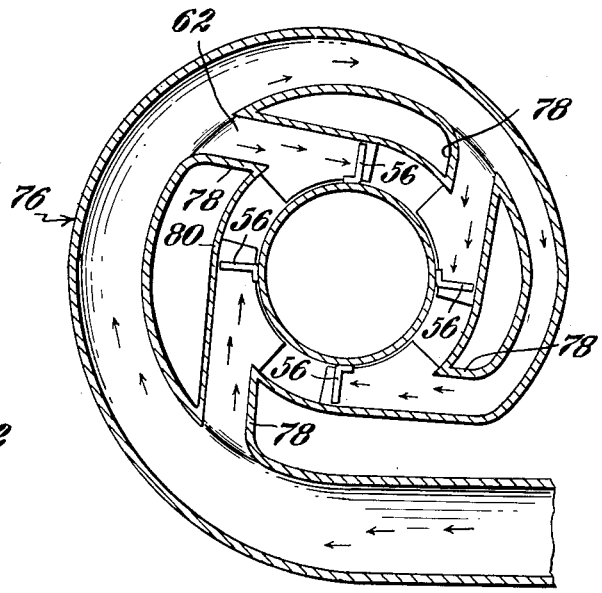
Fig. 2 is a horizontal section taken on the line 2—2 of Fig. 1.

Rotation of the rotors 36 and 38 is effected by a combination of impact imparted to the blades 56 and 58 by a stream of water delivered thereto under pressure in a substantially horizontal plane tangential to the surface of the rotor 38 and by the impact of the falling water which has passed through the blades 56 and 58 upon the angularly arranged blades 60 and 74. As herein illustrated (Fig. 2) a spiral conductor 76 is arranged between the floors 50 and 54 in the plane of the upper level of the platform 62 and around the rotor 38 to which water is delivered under pressure. Extending inwardly from the spiral conductor are a plurality of laterals 78, which are arranged to carry water to the surface of the rotor 38 in a direction substantially tangent to its surface and substantially at right angles to the blades 56. The laterals 72 are made fast to the platform 62 and provide peripherally extending walls 80 which just clear the outer edges of the blades 56, thereby housing the blades so as to confine the water delivered thereto, preventing it from escaping other than through the holes 66 in the platform downwardly to the second set of blades. The laterals also have upper walls 82 enclosing the upper edges of the blades 56. Water delivered from the spiral through the laterals 72 strikes the radial blades substantially at right angles thereto, delivering the maximum impact to the blades, and as it fills the space, flows downwardly through the holes 66. All of the forward, that is tangential motion of the water is not used up in the initial impact with the blades 56 and the residue of this motion is imparted to the subjacent blades 58. These latter blades are enclosed by a peripheral wall 84 situated between the platforms and just clearing the edges of the blades. Below the platform 68 is another cylindrical wall 86 which encloses and just clears the edges of the angularly arranged blades, and forms a down passage between it and the peripheral wall of the rotor 38 through which the water flowing through the holes in the platform 68 gravitates, acts upon the blades 60 and then further gravitates through the fixed or stationary blades 72 to the blades 74. A sleeve 88 surrounds the fixed blades and a sleeve 90 surrounds and is spaced from the outer edges of the blades 74 so that the water flows continuously downwardly over the blades 74 and is discharged at the lower end of the rotor 36.

Figure 4:
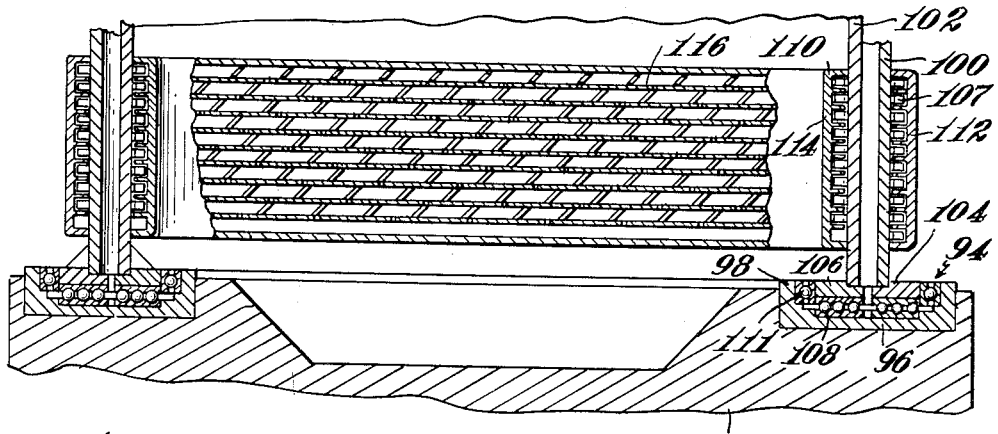
Fig. 4 is a vertical, diametrical section through an alternate form of the turbine employing the same principles of operation but using steam as a motivating fluid.

An alternative structure embodying the same principles of operation but in which the motivating fluid is steam, is shown in Fig. 4. As therein illustrated, there is a broad, substantially cylindrical concrete base 92 around the upper part of which is situated and supported thereby an annular shaped metal channel 94 having a bottom 96 and spaced, parallel, upwardly projecting flanges 98. Two concentrically arranged cylindrical shafts 100 and 102 are supported by the channel 94 for rotation about a vertical axis coincident with the perpendicular axis of the foundation. To this end, each shaft has at its lower peripheral edge a foot 104 and 106 which has a flat bottom surface of annular shape designed to rest upon ball bearing assemblies 108 placed in the channel so that the shafts may rotate in opposite directions relative to each other in the channel. Annular ball bearing assemblies 111 are placed between the vertical edges of the feet 102 and 104 and the flanges, thus guiding the shafts in their rotation and preventing weave or wobble. The inner shaft 102 provides the support for the rotor of the generator which is attached to its upper end in the same manner as described with reference to the water operated turbine, and the outer shaft 100 provides support for the field of the generator. Fast to the outside of the shaft 100 and to the inside of the shaft 98 are sets of blades 107 and 119, the outer extremities of which are enclosed by cylindrical casings 112 and 114, thereby providing closed vertical passages of annular form through which steam introduced to the topmost blade is constrained to pass downwardly to the lowermost blade. Between each set of blades there is a stationary blade or platform 116 through which the steam passes to the next lower set of blades on its way toward the outlet, and in accordance with the principles of steam engineering these openings become successively larger to permit progressive expansion of the steam as they approach the outlet so as to derive the full benefit of the energy given up by the steam in effecting rotation of the shafts. The steam will be delivered to the inlets of the respective shafts, either in opposite directions or in the same direction with the blades disposed at opposite angles.

While the principles of the reaction turbine are well understood, the present invention is concerned primarily with a compact arrangement of the operating parts for taking fullest advantage of these principles and securing efficient generation of power at a minimum cost and upkeep.

It should be understood that the present disclosure is for the purpose of illustration only and that this invention includes all modifications and equivalents which fall within the scope of the appended claims.

I claim:

1. In a reaction turbine, axially aligned, cylindrical rotors of corresponding diameter arranged end to end for relative rotation about a common vertical axis, so as to have a substantially continuous, vertically arranged, cylindrical, external surface to which may be attached blades for effecting relative rotation of the rotors, blades fast to the surfaces of the rotors, shrouds surrounding the blades and forming with the surfaces of the rotors a continuous annular passage for confining the motivating fluid while acting upon said blades, and means located internally of said rotors for supporting the same for relative rotation including an annular plate fast to the inside of the lower rotor at its upper end, a cylindrical, pedestal-like support having an upper end over which the rotor is placed with the annular plate resting on its top and with its cylindrical wall extending downwardly about the pedestal, anti-friction means located between the annular plate and the top of the pedestal and between the lower end of the cylinder and the pedestal to hold the rotor concentric with the axis of the pedestal during rotation thereof, an annular plate fast to the inside of the upper rotor at its lower end supported on the annular plate of the first rotor, with anti-friction means situated between the plates for supporting the upper rotor for rotation relative to the lower rotor, and current generator components associated with the rotors, one of said components being made fast to the bearing plate of the lower rotor and rising therefrom through the upper rotor, said other component of the generator being made fast to said supporting structure in concentric current generating relation to said one component.

2. In a reaction turbine, axially aligned, cylindrical rotors of corresponding diameter arranged end to end for relative rotation about a common vertical axis, so as to have substantially continuous, vertically arranged, cylindrical, external surfaces to which may be attached blades for effecting relative rotation of the rotors, blades fast to the surfaces of the rotors, shrouds surrounding the blades and forming with the surfaces of the rotors continuous annular passages for confining the motivating fluid while acting upon said blades, and means located internally of said rotors for supporting the same for relative rotation including an annular plate fast to the inside of the lower rotor at its upper end, a cylindrical pedestal-like support having an upper end over which the rotor is placed with the annular plate resting on its top and with its cylindrical wall extending downwardly about the pedestal, anti-friction means located between the annular plate and the top of the pedestal and situated between the lower end of the cylinder and the pedestal to hold the rotor concentric with the axis of the pedestal during rotation thereof, an annular plate fast to the inside of the upper rotor at its lower end supported on the annular plate of the first rotor, and anti-friction means situated between the plates, current generating components associated with the rotors, one of said components being made fast to the upper end of the upper rotor, a hollow column fast at its lower end to the bearing plate of the lower rotor, and having upwardly diverging walls rising within the upper rotor to above its upper edge, bearings situated between the lower end of the hollow column and the inner edge of the annular bearing plate for the upper rotor, and between the hollow column and the upper rotor near its upper edge to take up lateral thrusts and hold the upper rotor concentric with the axis of rotation of the lower rotor, and generator components fixed to the upper part of the upper rotor and the upper end of the hollow column in concentric, current generating relation.

References Cited in the file of this patent

UNITED STATES PATENTS

| Number | Name | Date |
| --- | --- | --- |
| 25,521 | O'Neil | Sept. 20, 1859 |
| 224,128 | Bates | Feb. 3, 1880 |
| 269,208 | Hook | Dec. 19, 1882 |
| 611,472 | Gillespie | Sept. 27, 1898 |
| 713,158 | Savage | Nov. 11, 1902 |
| 777,865 | Stumpf | Dec. 20, 1904 |
| 822,317 | Stumpf | June 5, 1906 |
| 1,216,162 | Pratt | Feb. 13, 1917 |
| 1,383,361 | White | July 5, 1921 |
| 1,812,946 | Grubb | July 7, 1931 |
| 1,945,373 | Nolan | Jan. 30, 1934 |
| 2,199,319 | Lansing | Apr. 30, 1940 |
| 2,246,472 | Sharp | June 17, 1941 |
| 2,366,732 | Kalix | Jan. 9, 1945 |

FOREIGN PATENTS

| Number | Country | Date |
| --- | --- | --- |
| 540,347 | France | Apr. 15, 1922 |